Figure 1:
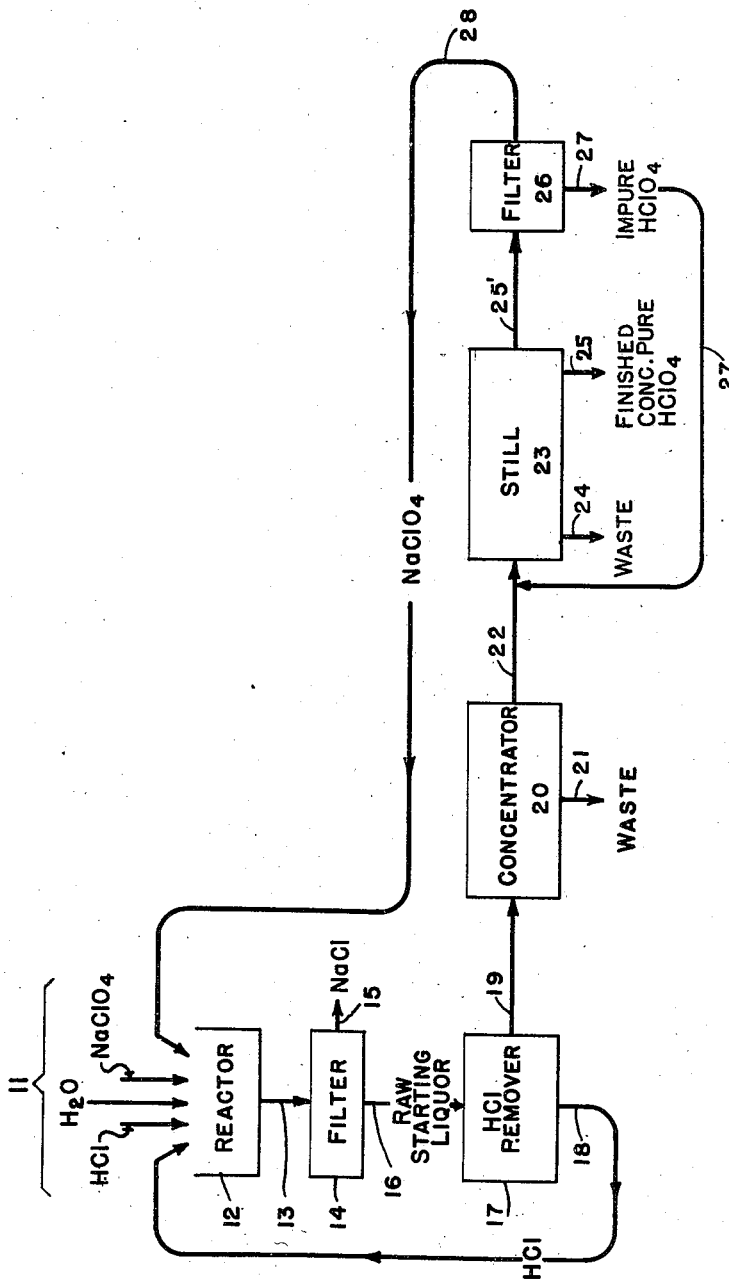

Jan. 15, 1946.  J. C. PERNERT  2,392,861
MANUFACTURE OF PERCHLORIC ACID
Filed May 18, 1943  4 Sheets-Sheet 1

FIG.I.

INVENTOR.
JOHN C. PERNERT,
BY
ATTORNEY

Jan. 15, 1946.        J. C. PERNERT        2,392,861
MANUFACTURE OF PERCHLORIC ACID
Filed May 18, 1943        4 Sheets-Sheet 2

Jan. 15, 1946.  J. C. PERNERT  2,392,861
MANUFACTURE OF PERCHLORIC ACID
Filed May 18, 1943   4 Sheets—Sheet 4

INVENTOR.
JOHN C. PERNERT,
BY
ATTORNEY

Patented Jan. 15, 1946

2,392,861

UNITED STATES PATENT OFFICE 2,392,861

MANUFACTURE OF PERCHLORIC ACID

John C. Pernert, Niagara Falls, N. Y., assignor to Oldbury Electro-Chemical Co., Niagara Falls, N. Y., a corporation of New York Application May 18, 1943, Serial No. 487,498

6 Claims. (Cl. 23—152)

This invention relates to the manufacture of perchloric acid in quantities, in concentrations and of a purity that meet the requirements of the most exacting customer therefor, but certain of the stations and steps contemplated by this invention may have more general usefulness. Perchloric acid made by the use of this invention preferably involves the following fundamental reaction:

$$NaClO_4 + HCl \rightarrow NaCl + HClO_4$$

namely, sodium perchlorate is reacted with hydrochloric acid to yield perchloric acid and sodium chloride. The perchloric acid is then treated to concentrate and purify it, so that such acid is the desired end product of this invention.

In the practice of a commercial scale process of making perchloric acid, the initial reaction product acid is yielded along with certain contaminating impurities which comprise admixtures such as other reaction products, some unreacted reactants, and which also may or may not include other undesirable substances. Therefore, one object of this invention is to remove such contaminating impurities expeditiously, and if possible to reclaim any impurities which may be usable as additional starting reactant materials. Another object of this invention is to bring about the yielding of the perchloric acid in purified and concentrated condition, namely of the order of from 70% to 72% or slightly higher concentration. A further object is to control the degree of concentration of the acid yielded. Another object is to produce the acid cheaply, dependably and continuously, while requiring a minimum of attention.

To that end, this invention may be better understood by dividing the perchloric acid making plant into different stations. Of these, the first may be called the reaction station wherein the raw starting materials are reacted; a first filter station; a concentrated HCl removing station; a perchloric acid concentrating station; a distilling station; and a second filter station.

In general, the functions of these stations are as follows: In the reaction station, called hereinafter Reactor, for short, the raw reactant starting materials are brought into contact with each other under conditions where reaction takes place and reaction products yielded. These products include NaCl and a complex dilute liquor comprising $H_2O$ and the following ions $H^+$, $Na^+$, $Cl^-$, $ClO_4^-$, and possibly other constituents. The reaction products are then passed to a first filter station whose principal function is to filter out NaCl from the complex liquor. The filtrant liquor is then supplied to the concentrated HCl removing station, which will be referred to hereinafter for short, as the Remover. One purpose of the Remover is to remove and reclaim from the complex liquor fed thereto, HCl distillate in solution form whose HCl concentration is controllable at will. The residual complex liquor next passes to the perchloric acid concentration station, called for short hereinafter the Concentrator, from which is derived essentially concentrated but impure $HClO_4$. Such impure $HClO_4$ is fed to the $HClO_4$ distilling station, called hereinafter, the Still, from which is derived concentrated pure $HClO_4$ as the desired end product, and another product comprising a complex mixture including $NaClO_4$ and impure $HClO_4$. This mixture is passed to a second filter station whose function is to separate the $NaClO_4$ from the $HClO_4$. The separated-out $NaClO_4$ and the concentrated HCl are or can be recycled to the Reactor to be used to supplement the raw starting reactant materials in the Reactor.

Features of advantage flow not only from the specific construction and arrangement of these stations per se, but also from the manner in which they are connected and interconnected, as well as from their conjoint action. A feature of importance is that at least some of these stations make use of the barometric leg principle and operate under sub-atmospheric pressure while associated therewith is a system of a boiler followed by stagewise condensation, all of which contributes to the attainment of new and novel results. Another feature of importance and advantage is the boiler arrangement of both the Concentrator and the Still wherein the vaporized constituents of the treated material pass upwardly while the left-behind products remove themselves from the boiler by gravity.

Still another feature of advantage is derived from the Still that has the property of being self-feeding at a rate that is automatically controlled so that the quantity of material fed thereto is always correct. A further feature is the use of a vertical, steam-jacketed glass tube boiler. A still further feature is embodied in means for maintaining the position of solutions to be treated in such a boiler, at a proper working level therein by the use of a barometric leg. Again, an additional feature resides in the barometric leg means whereby solid non-volatile residue is continuously and automatically removed in the Still. Another resides in the use of the hot condenser principle to be later described herein. And even further advantages will be made clear as the description of the invention, and an embodiment thereof, unfolds hereinafter, which include control of the purity of the attained perchloric acid.

Figure 2:
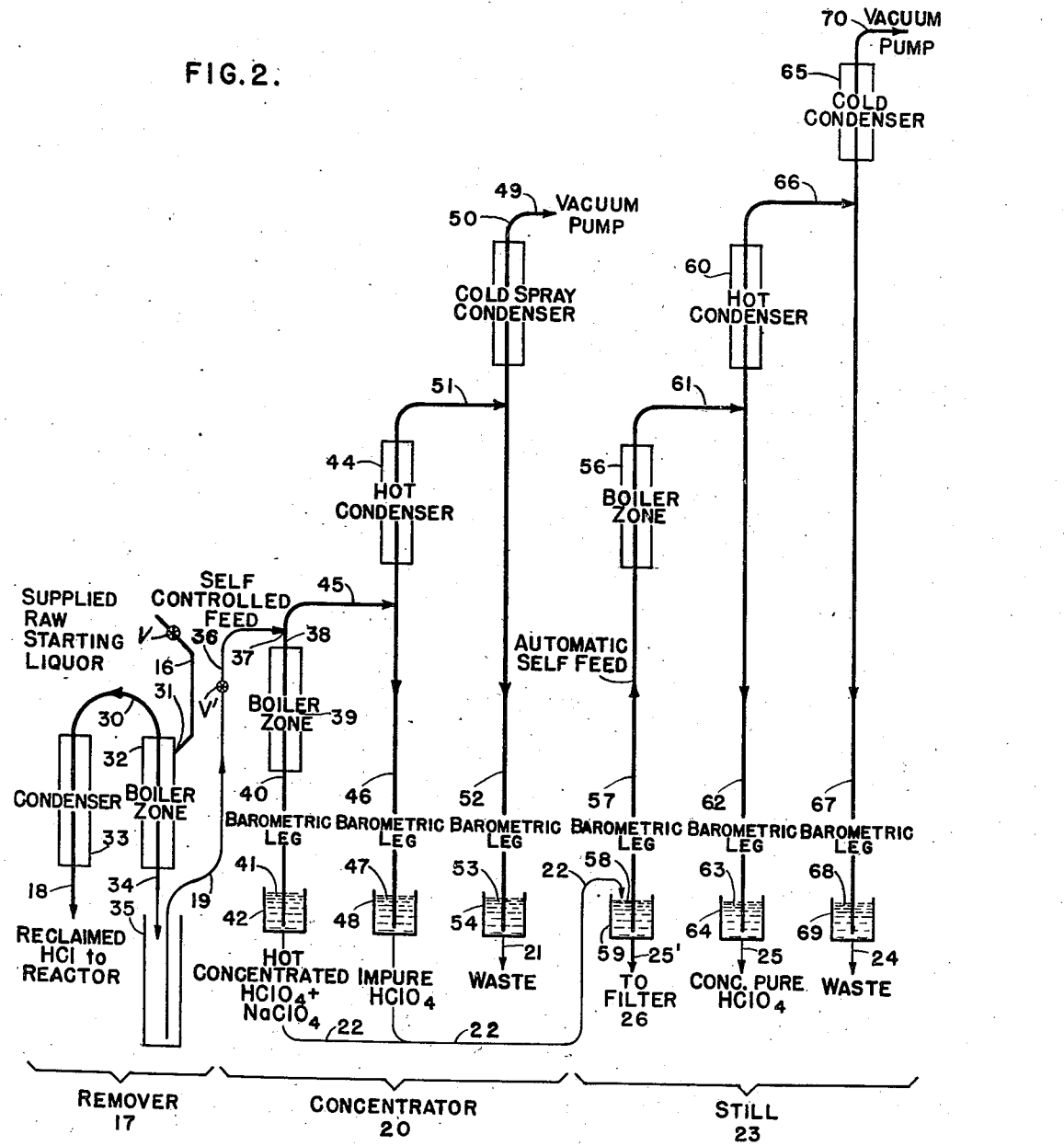
Figure 3:
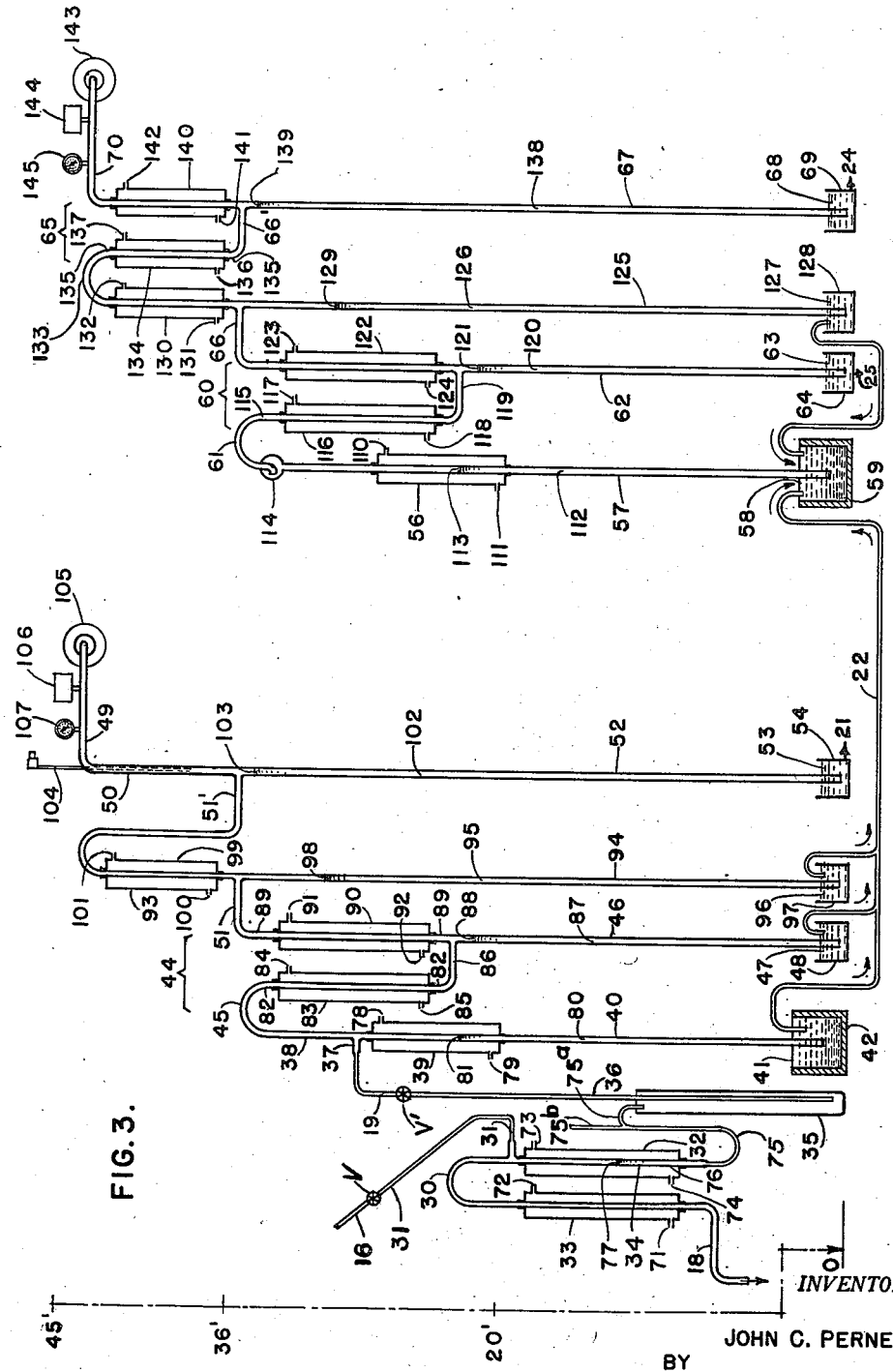
Figure 4:
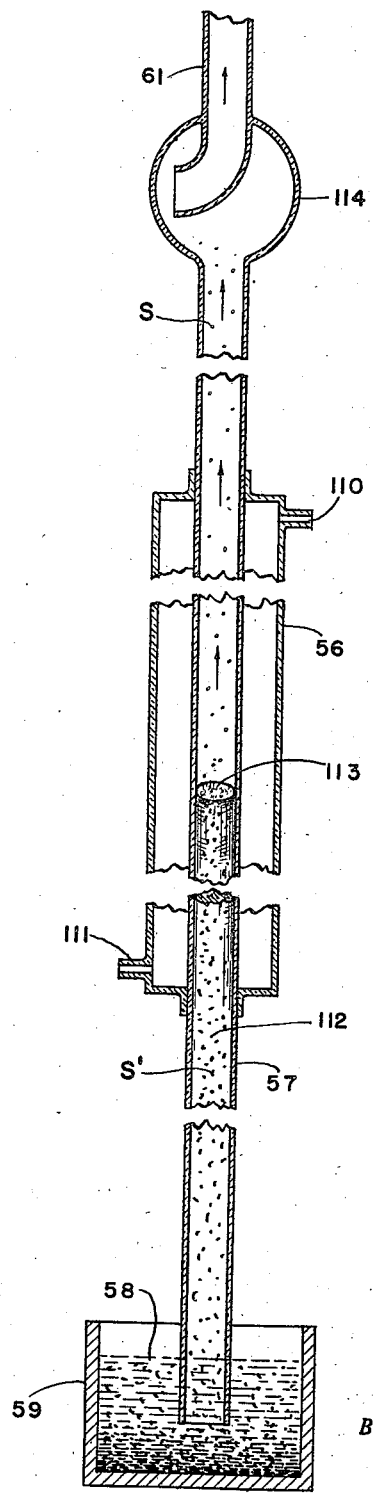

For a more particular understanding of this invention, a preferred embodiment of the invention has been illustrated in the accompanying drawings, in which Figure 1 shows diagrammatically the arrangement of the various stations depended upon for conjoint action. Fig. 2 is a diagrammatic showing of the Remover, the Concentrator and the Still stations without any attempt at showing them complete, but enough to give an idea of their general construction and function. Fig. 3 shows diagrammatically what Fig. 2 shows, but greater detail is made use of. Fig. 4 shows a detail of the liquid-level as it functions in the boiler or vaporizing zones, the view being a partial perspective one, with parts broken away and also shows a detail of the Kjeldahl bulb as being illustrative of what may be used to trap spray splashing forwardly from the solution in the boiler zone of the Still so that such solids are returned to the boiler zone.

Referring to Fig. 1, the numeral 11 indicates generally the starting materials comprising essentially the reactants $NaClO_4$ and HCl in solution that are fed to a stirred or agitated reaction vessel or Reactor 12 wherein reaction takes place to yield $HClO_4$ and NaCl. Reaction products are passed through pipe 13 to a filter station 14, called herein the first filter station, whose function is to discharge by one path 15, solid phase material present in the reaction magma, especially such as NaCl, while filtrate which comprises raw starting liquor 16 passes forwardly from the filter 14 to the HCl Remover 17. The operation of the Remover is based upon the property of the solutions so treated to evolve HCl gas along with very little $H_2O$, whereby the proportion of HCl to $H_2O$ in the distillate solution can be controlled at will by the rate at which the liquor is fed to the Remover, the faster the rate the more concentrated the HCl in the solution, and vice versa. Therefore, the function of the Remover is to yield a distillate solution having therein such a controlled concentration of HCl 18 that it can be recycled to be used as a partial or supplemental constituent of the starting materials 11, that is, about 35% HCl by weight and 65% $H_2O$ by weight, which is equivalent to what is known as commercial hydrochloric acid. The Remover 17 also yields by another pathway, possibly valved at V' (Fig. 2), a complex dilute liquor 19 that is treated in the $HClO_4$ Concentrator 20. This station or instrument discharges waste material 21 by one pathway, while passing on through another pathway a somewhat concentrated but still complex liquor 22 which contains concentrated but impure $HClO_4$, which complex liquor is next treated in the Still 23. From the Still 23 there is discharged waste 24 by one pathway, and through another pathway is passed concentrated purified $HClO_4$ 25. Through another pathway, if desired, is passed on a liquor or liquid suspension 25' of concentrated $HClO_4$ and $NaClO_4$. This suspension is supplied to second filter station 26 which is adapted to yield as filtrate, $HClO_4$ 27, and to yield as the other filter product or filtrant 28, $NaClO_4$ which is or can be recycled to be used as a partial or supplemental constituent of the starting materials 11.

Thus Fig. 1 discloses what may be termed a general flowsheet or flow-chart of one embodiment of this invention showing the sequence of the stations thereof. Passing now to Fig. 2, which although still diagrammatic, shows some of the fundamental features of operation of the Remover, the Concentrator, and the Still stations respectively. Considering the Remover 17, it is made up of a boiler or vaporizing zone 32 appropriately heated to a temperature above which HCl vaporizes, that is connected with a discharge pipe 34 and a vapor conducting pipe 30 from its upper section that conducts vapor to a condenser 33 having a discharge pipe 18 from which a concentrated solution of HCl is obtained. The raw dilute starting liquor 16 from the filter station 14 is supplied to the Remover 17 through pipe 31 connected to the Remover at a point adjacent the upper region of the boiler zone, and discharged impure $HClO_4$-bearing complex liquor from the boiler zone passes out of the pipe 34 to be accumulated in a container 35, whence it is drawn for further treatment. The Remover preferably operates at atmospheric pressure, and distillate solution therefrom is controlled to comprise 35% HCl, having a specific gravity of 1.178, although this concentration can be changed by the rate of feed to the Remover.

Turning attention now to the Concentrator 20, it comprises essentially a flowpath of tubing in which suction can be maintained and through which is impelled, complex $HClO_4$-bearing liquor from which a quantity of HCl and of $H_2O$ has been removed in the Remover 17. During transit of the complex liquor through the flowpath, $HClO_4$ is concentrated but not substantially otherwise purified. This Concentrator station is characterized by a vaporizing or boiler zone 39 maintained at a temperature whereat at least water is vaporized in that zone under the conditions existing therein. Liquor 19 to be treated in the Concentrator is automatically sucked thereinto through the pipe 36 from the liquor container 35. Feed pipe 36 joins the Concentrator 20 at a point 37 above the boiler 39. Associated with the boiler zone 39 is a barometric leg 40 liquid-sealed in a pool of liquid 41 which is concentrated $HClO_4$ held in a basin 42. Associated with the upper section of the boiler 39 is a tube 45 forming a vapor conveying passage leading to a Hot Condenser zone 44 maintained at a temperature above that at which water boils under the conditions existing therein. Associated with this Hot Condenser 44 is a barometric leg 46 liquid-sealed in a pool of liquid 47 which is impure concentrated $HClO_4$ held in a basin 48.

Vapors pass from the Hot Condenser 44 upwardly and forwardly through a tube 51 to a Cold Condenser 50 preferably of the spray type. The Cold Condenser has associated with it a barometric leg 52 liquid-sealed in a pool of waste liquid 53 held in a basin 54, from which basin, liquid 53 passes to waste through pipe 21. 49 indicates a tube or pipe leading to a vacuum producer adapted also to suck vaporous material of the Concentrator 20 upwardly and forwardly through the boiler zone 39 and the subsequent Hot Condenser zone 44 and Cold Condenser zone 50. Since there is a sub-atmospheric pressure thus effected in the flowpath tubing of the Concentrator 20, the barometric legs 40, 46 and 52 must be of such a length that at least their liquid column contents respectively are not sucked out thereof by reason of the suction exerted by the vacuum producer. The boiler zone 39 is so related to its barometric leg 40 that the range of normal fluctuations of the liquid-level of the liquid column therein lie well within the boiler zone 39. And similarly, the Hot Condenser zone 44 is so related to its barometric leg 46, that the range of normal fluctuations of the liquid-level of the liquid column therein lie well below the pipe 45 for otherwise Hot Condenser liquid would flow back to the boiler zone 39. And this requirement is also essential with respect to the Cold Condenser zone 50 for liquid therefrom must not flow back through 51 to the Hot Condenser. Concentrated HClO$_4$ 41 is discharged from the barometric leg 40 while still hot, or at least warm, so that under operating conditions there is little or no separation of NaClO$_4$ from this liquor. This liquor, together with the impure HClO$_4$ 47 in basin 48 are both supplied through conduit 22 or other means, to be treated in the Still 23, or in some instances, the basins 42 and 59 may be one and the same.

Turning now to the Still station 23, its apparatus closely resembles the apparatus of the Concentrator 20, as can be seen from Fig. 2, but the internal conditions are somewhat different, especially as regards temperature, for whereas in the Concentrator, HClO$_4$ is concentrated substantially irrespective of its impurities, in the Still the concentrated acid is to be relieved of its non-volatile impurities and at the same time the degree of concentration of the obtained pure acid is accurately controlled. Therefore, 56 indicates the vaporizing or boiler zone of the Still wherein is maintained a temperature above that at which HClO$_4$ vaporizes under conditions of pressure existing in that zone. Associated therewith is a barometric leg 57 liquid-sealed in a pool of concentrated liquor 58 which is held in concentrated-liquor basin 59. In basin 59, there is an accumulating of non-volatiles most of which crystallize out as NaClO$_4$, so liquor 58 becomes substantially saturated with this salt, whereupon it can be filtered therefrom in filter 26 by being passed thereto through pipe 25'. This liquor also includes the complex liquor 22 from the Concentrator 20, which is the starting material to be treated by the Still, for it is sucked automatically up through the barometric leg 57 as it is required by the boiler 56. Vapors from the boiler 56 are sucked through pipe 61 to a Hot Condenser 60 which has associated therewith a barometric leg 62 that is liquid-sealed in a pool of liquid 63 held in basin 64. Liquid 63 comprises the desired concentrated purified perchloric acid. Vapors passing from the Hot Condenser 60 are conveyed through pipe 66 to the Cold Condenser 65 which also has a barometric leg 67 that is liquid-sealed in a pool of liquid 68 in basin 69. 70 indicates a vacuum producer, such as a hydraulic vacuum pump, which produces the vacuum and suction in the flowpath piping. The same precautions of liquid level requirements in the respective barometric legs of the Concentrator 20 applies equally to the corresponding legs of the Still. The temperature maintained in the Hot Condenser 60 is such that HClO$_4$, along with sufficient water to give the required concentration of HClO$_4$ solution, is selectively condensed from the HClO$_4$-bearing gases or vapors which vapors that escape condensation here pass on to be condensed later in other condensers such as the Cold Condenser 65.

Comparing the Concentrator 20 with the Still 23, the following is to be observed: to the Concentrator is automatically fed, as fast as produced by the Remover 17, a starting material 19 of a complex dilute liquor which has been freed however, from most of its HCl content. Therefore, the boiler zone 39 is heated at least so that the volatizable impurities (such as H$_2$O) of the HClO$_4$ will be vaporized but with a minimized quantity of HClO$_4$ being also vaporized. Thus HClO$_4$ so treated, descends with any solids suspended therein, downwardly through the column of liquid in the barometric leg 40. The vaporized constituents pass to the Hot Condenser 44 wherein they are only partially cooled to a temperature whereat (as correlated to the sub-atmospheric pressure existing therein) any perchloric acid which may have reached that Condenser is condensed, while the other volatilizable impurities pass forward to be condensed in the Cold Condenser 50 and passed to waste. However, when the Still is considered the vaporizing or boiler zone 56 is maintained at a temperature correlated with the pressure effective therein, so that at least perchloric acid is vaporized therein along with all vaporizable impurities that may be mixed therewith. The non-volatile materials (ranging possibly from 1% to 9% of the solution), are left behind and descend in the liquid column in the barometric leg 57. The vapors pass to the Hot Condenser 60 which is cooled enough to condense the HClO$_4$ while letting the other vaporized constituents go forward to be condensed in the Cold Condenser 65 and pass to waste. From the Hot Condenser 60, condensed and purified HClO$_4$ descends in the liquid column in the barometric leg 62 where this material is collected in basin 64 as the end product HClO$_4$.

Another difference between the Concentrator and the Still is that the operator controls (even though possibly indirectly), the rate of feed in the pipe 36 passing to the Concentrator, whereas the Still automatically controls its own rate of feed. It also automatically and continuously discharges non-distillable residue. The strength of the HClO$_4$ recovered from the Still is controlled by correlating the temperature and pressure within therein to yield the desired strength. The Concentrator has proven successful when made of 3-inch flanged glass whereas in the Still the tubing was of two-inch blown glass. How this all is accomplished will be described later in detail. The Condenser and the Still both preferably operate under vacuum.

From this description of the operation of the process, it can be surmised that the raw dilute complex starting liquor 19 supplied to the Concentrator 20 should have as little as possible of sodium salts. For that reason, the original reaction in the reaction vessel 12 is carried out with a view to minimizing the production of NaCl in any other than in solid phase, so that a minimum thereof is left in solution. Nevertheless, NaCl is unavoidably soluble to some extent in the HClO$_4$, H$_2$O mixture that is treated in the Remover 17, but any sodium salts that are so left in solution, tend to be recovered later in the process as NaClO$_4$, which of course can be returned to the process.

Typical analyses of the liquors at the different stages are:

*Raw starting liquor 16*

| | | |
|---|---|---|
| Specific gravity | | 1.350 |
| HClO$_4$—432 grams per liter | per cent | 32.0 |
| HCl—109 g. p. l | do | 8.1 |
| Non-volatile—79.5 g. p. l | do | 5.9 |
| Water (by difference) 730 g. p. l | do | 54.0 |

*Liquor 34 discharged from remover*

| | |
|---|---|
| Specific gravity | 1.395 |
| HClO₄—550 g. p. l per cent | 39.4 |
| HCl—12 g. p. l do | .86 |
| Non-volatile—101 g. p. l do | 7.24 |
| H₂O (by difference) 732 g. p. l do | 52.5 |

*Liquor 41 discharged from concentrator*

| | |
|---|---|
| Specific gravity | 1.58 |
| HClO—900 g. p. l per cent | 57.0 |
| HClO₄—0.6 g. p. l do | 0.04 |
| Non-volatile (NaClO₄) 166 g. p. l do | 10.5 |
| H₂O (by difference) 514 g. p. l do | 32.46 |

*Finished acid 63 from still*

| | |
|---|---|
| Specific gravity | 1.678 |
| HClO₄ per cent | 71.0 |

HCl less than 0.1 P. P. M.
Non-volatile less than 5 P. P. M.
Iron less than 1 P. P. M.

Thus, comparing the liquor 41 and the acid 63 of these last two tables the non-volatile impurities have been reduced from 139,000 P. P. M. in the liquor to less than 5 in the finished acid.

It should be understood that Fig. 2 and the description thereof does not contain all of the disclosure needed to practice this invention. This figure and its description has been adopted to help the reader to a better understanding of the invention by leading him along step by step, or a little at a time, until the entire invention is grasped. But at least by now, the reader will understand the general construction and purpose of the respective stations, and especially those of the Concentrator and of the Still.

With this preparatory information and ground work, reference is now made to Fig. 3 which shows, while yet diagrammatically, all of the fundamental principles of a full commercial scale operating plant for the practice of this invention. This figure follows Fig. 2 closely but is expanded as to details. In it other details are shown for each of the Concentrator and Still stations together with an indication of operative requirements which will now be described.

The general plan of Fig. 3 follows that of Fig. 2, in that the Remover 17, the Concentrator 20 and the Still 23, are indicated thereon. Referring to the Remover station 17, it is constructed of an inverted U-shaped tube having one leg with an intake 31 preferably valved as at V and another leg with an outlet 18. The two legs are connected by a curved section 30. The outlet leg is equipped with a cooling or condensing zone 33 provided by a cold water jacket encircling the tubing and having a water inlet 71 and a water outlet 72. The intake leg is equipped with a boiler or vaporizing zone 32 provided by a steam jacket encircling the tubing and having a steam inlet 73 and an outlet 74. The intake leg has a terminal 34 which is provided with an S trap arrangement 75 whose high point 75a rises to an elevation such that a pool of liquid 76 is retained in the tubing within the boiler zone 32 so that the liquid level 77 of the liquid pool 76 is maintained substantially well within the boiler zone 32, about as shown. Liquid passing out through the S-trap 75 is caught in the container 35. 75b indicates a vent section for the trap to prevent siphoning.

The Concentrator 20 is constructed to have an intake tube or pipe 36 feeding feed-liquor 19 to a flow-path formed of tubing characterized by having a vertical vaporizing or boiler zone 39 provided with a steam jacket encircling the tubing and having a steam inlet 78 and a steam outlet 79. Associated with the boiler 39 is a barometric leg 40 in which is maintained a column of liquid 80 rising from the liquid 41 in basin 42. The length of the barometric leg 40 and its liquid column 80 is such that under the condition obtaining in the tubing, the liquid level 81 of the liquid column is maintained within the boiler zone 39. The flowpath continues forwardly from the boiler 39 by means of the section 38 of the tubing and curved section 45 to a Hot Condenser Zone indicated generally by the numeral 44. In the preferred form, this Hot Condenser zone is formed by a further section 82 of the tubing which has a hot water jacket 83 encircling the section 82, provided with a hot water inlet 85 and a water outlet 84. The tubing then has a connecting section 86 that connects with the Hot Condenser barometric leg 46 which contains a column of liquid 87 that due to the suction within the tubing extends upwardly from the pool 47 in basin 48 but never high enough to back flow in section 86. It normally rises to a level about as shown at 88. A forward extension 89 of the barometric leg 46 is provided with another hot water jacket 90 encircling the section 89, provided with a hot water inlet 92 and a water outlet 91.

51 represents a further section of the tubing flowpath which connects with an Intermediate Condenser zone 93 having associated therewith a barometric leg 94 in which is maintained a column of liquid 95 extending from a pool 96 in basin 97. The column rises to a level 98 about as shown, but never high enough to back flow in section 51. The Intermediate Condenser zone 93 comprises a warm water jacket encircling the tubing and provided with a warm water inlet 100 and a water outlet 101. From the exit end of the jacketed zone 93 is a further tubing section 51' that connects with the Cold Condenser 50 and its barometric leg 52 having maintained therein a column of liquid 102 extending from the pool 53 in basin 54 to a liquid level 103, about as shown, but never high enough to back flow in section 51'. 104 indicates a cold water spray means, while attached to the piping section 49 leading to a vacuum producer or pump 105 is a pressure, or vacuum, regulator 106 and a pressure indicator 107.

The Still 23 is preferably constructed to provide a flowpath such as by a tubing that comprises a barometric leg 57 which is provided with a vertical vaporizing or boiler zone 56 formed by a steam jacket encircling the tubing and having a steam inlet 110 and a steam outlet 111. The barometric leg 57 has maintained therein a column of liquid 112 extending from the concentrated liquor pool 58 in basin 59, and rising, under the conditions existing within the tubing, to a liquid level 113 that lies within the boiler zone 56. Above the boiler zone 56, is a solids trap such as a Kjeldahl head or bulb 114. The flowpath passes on through section 61 to a Hot Condenser zone indicated generally by the numeral 60 and comprises a tubing section 115 that has encircling it, a hot water jacket 116 provided with a hot water inlet 118 and a water outlet 117. The flowpath then passes through a section 119 which connects with the Hot Condenser barometric leg 62 in which is maintained a column of liquid 120 extended from the pool 63 in basin 64 upwardly to have a liquid level 121 at a level about as shown. Associated with the barometric leg 62 is another Hot Condenser comprising tubing section 122 with a jacket having a hot water inlet 124 and a hot water outlet 123. From the exit end of this tubing section 122 is a connecting pipe 66 that joins a further barometric leg 125 which may be called the Intermediate Condenser leg. In it is maintained a column of liquid 126 extending from a pool 127 in basin 128, and rising to a liquid level 129 at an elevation about as shown. Associated with this leg 125, is an Intermediate Condenser jacket 130 encircling the tubing and having a warm water inlet 131 and a water outlet 132. 133 indicates a section of the tubing that passes to a Cold Condenser zone, indicated generally by the numeral 65. This zone is preferably made into two parts or of two units. The first part comprises a cold water jacket 134 encircling a section 135 of the tubing, provided with a cold water inlet 136 and a water outlet 137. The flowpath progresses forwardly through the connecting tube 66' to the Cold Condenser barometric leg 67 in which is maintained a column of liquid 138, extending from the pool 68 of basin 69 and rising, under the conditions within the tubing, to a liquid level 139, about as shown. Associated with this leg is another Cold Condenser zone or cold jacket 140 having a cold water inlet 141 and a water outlet 142. The flowpath then progresses through a section 70 connected with a vacuum producer or pump 143, and with this section 70 is connected a pressure regulator 144 and a pressure indicator 145.

This figure is drawn substantially to scale, at least to the extent of showing the relative heights or lengths of the barometric legs, indicated by the scale in feet indicated at the left hand side of the figure. Basins 42 and 59, with their respective pools 41 and 58 can be one and the same, or liquor from one can be conducted to the other, preferably from basin 42 to concentrated liquor basin 59, as indicated by the line 22. Similarly, if desired the contents or pools of basins 48, 97 and 128 can also be conducted preferably to basin 59. Or again, the contents of basins 97 and 128 may be recycled to the Reactor 12 (Fig. 1). The liquor in basins 54 and 69 pass to waste, while the liquor in basin 64 comprises end-product concentrated pure HClO4.

The operation of the Remover apparatus exemplified in Fig. 3 is as follows: The raw starting liquor 16, which comprises the filtrate from the Filter 14 is supplied at a rate controlled, for instance by any control means such as valve V, through inlet 31 to the Remover 17 at an elevation above the top of the boiler zone 32 whence at least some of the liquor falls into the pool 76 maintained in the boiler zone 32 by means of the S-trap 75 and its high point 75a. In the boiler zone 32, the liquor has its temperature raised by the steam in the encircling jacket of the boiler zone 32, to a point above the vaporization point of HCl under the conditions of pressure existing in that zone, which are preferably normal atmospheric pressure, or substantially so. At such temperatures, HCl gas is vaporized from the solutions of the pool 76 along with some water. The rate of feed to the Remover controls the proportion of water and of HCl that are vaporized. Thus, the concentration of HCl in the water vapor can be controlled at will, namely, by the rate of feed to the Remover. The HCl and H2O gases pass over the curved section 30 of the Remover and then through the Condenser zone 33 whereupon on encountering the temperature therein the mixed vapors are cooled by the cooling water of the jacket 33, the mixed HCl and H2O gases are condensed as a purified distillate solution having an acid strength or proportion of about 35% and water proportion of about 65%, with a typical specific gravity of 1.178. The strength or concentration of the thus obtained acid can be controlled in general, to give a solution of HCl from, say, 20% to saturated, by careful control of the rate of feed of the raw starting liquor to the Remover. Liquor from the pool 76 with its non-volatilized constituents passes automatically over the high point 75a of the S-trap 75 to be collected in the container 35. The S-trap 75 has the function of maintaining the liquid level 77 of the pool in the boiler zone 32 high enough therein to get efficient vaporizing effects on the pool by the steam in the encircling jacket of the boiler zone. The liquor in the container 35 is a complex liquor and includes as constituents, HClO4, H2O, some unreacted reactants such as NaClO4 and possibly other sodium salts, and other impurities such as compounds of iron.

The operation of the Concentrator apparatus exemplified by Fig. 3 is as follows: Complex liquor 19 from the container 35 from which a quantity of HCl and of H2O has been removed, is sucked through inlet pipe 36 into the Concentrator 20 by means of the sub-atmospheric pressure exerted within the entire flowpath through the piping of the Concentrator 20, by means of the vacuum producer or pump 105 (preferably of the water jet type) at the terminal end of the Concentrator. Indeed, it is the suction of this pump that causes the continual forward progress through the piping of the flowpath, by the material being treated therein. Therefore, the vacuum producer or pump 105 has the double purpose of (1) a pump, and (2) a controller of the pressure within the piping. The importance of the latter will appear hereinafter.

The complex liquor 19 enters the Concentrator 20 (which if desired may be controlled by valve V') through pipe 36 and inlet 37 at an elevation above the boiler or vaporizing zone 39 so that such liquor may fall into the pool or liquid column 80 maintained at a liquid level 81 my means of the barometric leg 40. The barometric leg 40 is so arranged that the range of normal fluctuations of the liquid level 81 is maintained well within the boiler zone 39 in order to assure efficient vaporization effects on the liquor. Steam is supplied to the encircling jacket 39 to raise the temperature within the boiler zone, to a point in general below the vaporization point of HClO4 but above the vaporization point of volatile impurities of its solution. More specifically, the temperature of the zone is such that at the sub-atmospheric pressure existing therein, it is above the dew point of water, since a major purpose of the Concentrator is to evaporate a large amount of water from the HClO4-bearing liquor. In view thereof, the temperature used is such as to insure vaporization of water, even though some HClO4 may inadvertently also be vaporized. For that reason, it has been found satisfactory to use steam at 50 pounds pressure per square inch to heat the jacket 39. The feeding of the boiler zone 39 from its vapor-exiting end also has proved to be highly efficient. While ordinarily it is not necessary to control the rate of feed of liquor 19 through pipe 36 to the Concentrator, it may be desirable to do so, such for instance if it is desired to minimize the vaporization of the perchloric acid in the vaporizing zone 39.

So from the boiler zone 39, there descends hot liquor of non-volatilized constituents in the liquid column 80 in the barometric leg 40 into the pool 41 of the basin 42. This liquor tends to remain hot or at least warm enough to discourage sodium salts, such as NaClO₄ from crystallizing out to any great extent. This liquor, under normal operating conditions of this process and assuming that 70-plus percent of concentrated acid is aimed for, contains HClO₄ at about 60% concentration although contaminated with NaClO₄ and with iron compounds. From the boiler zone 39, there ascends or progresses forwardly therefrom, vapors comprising mainly water but also most of the HCl not previously removed by the Remover and some HClO₄, which are sucked by the vacuum pump 105 over the curved section 45 into and through the Hot Condenser zone indicated generally by the numeral 44. In Fig. 2, this Hot Condenser zone is shown as having only one condenser unit, but more than one condenser unit may be in the general Hot Condenser zone, so Fig. 3 shows the preferred form wherein two condenser units are used in series. Therefore, the vapors from curved section 45 enter the Hot Condenser unit 83 which has an encircling hot water jacket through which water is passed at from 90–95° C., for the purpose of raising the temperature within the condenser unit 83, which in correlation with the sub-atmospheric pressure existing within the tubing in the zone 83, will bring about the condensing of some of the water and some HClO₄ which may have been carried over. Condensate then flows into the barometric leg 46 into the column of liquid 87 therein, while vapors which have escaped being condensed pass upwardly through the second Hot Condenser unit 90 wherein they encounter a second condensing treatment in all respects like that obtaining in condenser unit 83. Condensate from the second Hot Condenser unit 90 also descends into the liquid column 87 of the barometric leg 46 and collects in pool 47 of basin 48. Vapors escaping the second Hot Condenser unit 90 are sucked through pipe 51 into the Intermediate Condenser 93, whose jacket 99 is supplied with water at about 20° to 25° C. wherein more condensate is yielded which descends into the liquid column 95 of the barometric leg 94 to join the pool 96 of basin 97. Vapors escaping uncondensed in this Intermediate Condenser zone 93 are sucked forwardly through pipe 51' to encounter in the Cold Condenser zone 50 a cold water spray 104 which does the final condensing, whereupon the condensed material, and the cold water descends to the liquid column 102 maintained in barometric leg 52 and joins pool 53 of basin 54 which passes to waste at 21. From the Cold Condenser zone 50 extends a pipe 49 provided with a pressure indicator 107, a pressure (or vacuum) regulator 106 and the vacuum pump 105. The operator can see from the indicator 107 what pressure is obtaining in the flowpath piping, and the regulator 106 can be set to regulate automatically the amount of pressure or rather suction, applied to the piping by the pump 105. In this system, satisfactory results have been obtained by setting the regulator 106 so that the pump applies a degree of vacuum on the entire piping system of the Concentrator equal to 1¼ inches of mercury. As has been stated, the Concentrator's principal function is to remove water from the liquor fed thereto. Feed liquor is supplied under atmospheric pressure and under indirectly controlled conditions from the container 35. Liquor supplied to that container is in turn controlled by the rate of feed of raw starting liquor 16 to the Remover. All discharges from the Concentrator are delivered also at atmospheric pressure. If it were not desired to reclaim all possible HClO₄, the double Hot Condensers need not be used, nor the Intermediate Condenser 93. By their use, a relatively small amount of acid is reclaimed from basins 48 and 97, but usually it is worth this extra effort.

Whereas the function of the Concentrator 20 is to concentrate the HClO₄ without positive attempt to purify it, the Still 23 has as its function, treating the concentrated impure acid to purify it. To that end, it vaporizes all the acid, frees such vapor of entrained solids, and then produces a condensate of acid in practically any degree of concentration desired, say, from 60% to 73%, although at the moment the desired grade runs between 70% and 72% concentration. Another function of the Still is to remove iron-bearing impurities from the acid so that only a few parts per million remain. The operation of the Still 23 as exemplified in Fig. 3 is as follows: Concentrated but impure HClO₄-bearing liquor from which HCl and water have been largely removed is supplied to the concentrated liquor pool 55 of basin 59 whence it is sucked up automatically through liquid column 112 in barometric leg 57 due to the suction existing in the entire flowpath piping or tubing of the Still 23, as a result of vacuum applied thereto by the vacuum producer or pump 143 at the end of the tubing, which has the combined functions of (1) pumping the material through the tubing, (2) applying sub-atmospheric pressure thereon, and (3) controlling the degree of pressure (or sub-pressure) within the tubing. The barometric leg is so arranged as to height and pressure therein, that the liquid column 112 has its liquid level 113 so maintained within the vertical boiler or vaporizing zone 56 that the range of normal fluctuations thereof lie within the boiler zone. The boiler zone is heated to a temperature above that at which, under the pressure existing in the tubing thereof, there is a vaporizing of the volatiles including HClO₄ to an extent of about 98% of the solution treated in that zone. This is accomplished by supplying steam under, say, 50 pounds pressure per square inch to the encircling steam jacket of the boiler zone 56. Liquor within the boiler zone 56 at the temperature and pressure maintained therein boils so that ebullition takes place and vaporized constituents (comprising on the average HClO₄ 60.8%; HCl 0.4%; and H₂O 38.8%) of the liquor 112 rises, but also there is splattered up some of the constituents of the liquor along with the rising vapors. This non-gaseous material is then caught and returned to the boiler zone 56 by some suitable entrapment means, exemplified by the Kjeldahl bulb or head 114. Vapors, comprising all constituents of the liquor 112 volatilizable at the HClO₄-vaporizing temperatures obtaining in the boiler zone 56, freed from spray, are sucked forwardly through curved section 61 of the tubing into a Hot Condenser Zone, indicated generally by the numeral 60. A single stage Hot Condenser 60, such as is shown in Fig. 2 may be used, but for greater efficiency, it is desired to use here a multiple unit Hot Condenser, equipped with two Hot Condenser units in series. So the vapors pass first to Hot Condenser unit 116 which is jacketed by hot water at between 90° and, say, 95° C., to provide a temperature in the tubing of the condenser, which at the pressure existing therein, lies enough below the condensation point of HClO₄ so that some 80% or 90% thereof condenses. From this first Hot Condenser unit 116 there is conducted through pipe 119, into the barometric leg 62 some condensate solution HClO4 which descends into the liquid column 120 in the leg 62. Vapors which escape condensation rise in the leg 62 and are sucked through the second Hot Condenser unit 122, that is similar to the first Hot Condenser unit 116, wherein more vapors are condensed which descend into the leg 62 to join the column of liquid 120 therein. Vapors escaping condensation in unit 122 contain relatively small but significant quantities of HClO4 along with H2O vapor and practically all HCl. They are sucked forwardly through pipe 66 into Intermediate Condenser 130, whose jacket is cooled with water at about 20 to 25° C. so that practically all remaining HClO4 and a quantity of H2O vapors are condensed therein which descend into the liquid column 126 of barometric leg 125. This condensate has about 30% acid. Vapors which here escape condensation contain H2O, HCl and traces of HClO4. They are sucked through curved pipe 133 into the Cold Condenser indicated generally by the numeral 65. Whereas the equivalent Cold Condenser in Fig. 2 is shown as being a single unit, for efficiency it is desired to have this a two stage unit into the first unit of which 134 vapors pass from the curved pipe 133. This unit is jacketed and cooled with cold water to a temperature below the dew point of water therein.

Through pipe 66' is sucked condensate and vapor into the barometric leg 67. Condensate descends into the liquid column 138 therein while vapors rise into the second Cold Condenser unit 140 which is jacketed and otherwise like unit 134. Here the remaining vapors of HCl and H2O are condensed and condensate descends into the liquid column 138 of barometric leg 67. The tubing beyond the Cold Condensers terminates in a vacuum pump 143 attached to a pipe 70 associated with which is a pressure indicator 145 and a pressure regulator 144. The pump is arranged ordinarily to apply a degree of vacuum to the flowpath tubing of the Still equal to about ¾ inch of mercury. Liquor descending in the Hot Condenser barometric leg 62 into the pool 63 of basin 64 is the finished product concentrated pure HClO4, say, of 71+% concentration. Liquor in the pool 68 of basin 69 goes to waste, while liquor in the pool 127 of basin 128 has enough dilute HClO4 to warrant its being redistilled, by being recycled to basin 59, for instance. In the concentrated liquor basin 59, the concentrated liquor 58 comprises a suspension or slurry of HClO4 and solid impurities such as NaClO4, which impurities accumulate therein due to their descent from the boiler zone 56, and such salts crystallize out. This slurry 25' (Fig. 1) may be passed to a second filter station 26 for separating out the NaClO4 for reuse as a starting material, and a filtrate 27 of about 60% acid which can be returned to the concentrated liquor 22, to be treated again in the Still.

The boiler zone 56 of the Still 23 has such important functions, that an enlarged perspective diagrammatic view thereof (with some proportions thereof exaggerated) is shown in Fig. 4 wherein it can be seen that the suspension or slurry from the pool 58 of the basin 59 is sucked upwardly through the liquid column 112 in the barometric leg 57 until it reaches a liquid level 113 controlled to lie within the boiler zone 56 due to correlating the height of the barometric leg 57 and the pressure therein plus the density of the liquid suspension being treated. Steam passing through the jacket of the boiler zone causes ebullition of the suspension and vaporization of all of the HClO4 present, which rises from the boiler zone as vapor.

But the ebullition is so violent that possibly some liquid constituents of the suspension rise as mist or spray along with the vapors in their ascent. These are indicated by the letter S. They rise with the vapors until the Kjeldahl bulb 114 is reached, whereupon they are rejected from further passage and are returned, due to their gravity, into the liquid of the boiler zone 56, so that only vapors pass onward from the bulb 114 through tubing 61 to the subsequent stage-wise condensing zones.

Any solids S' in being rejected from distillation descend literally like a snowstorm, due to their gravity, in the liquid column 112 of the barometric leg 57 until they accumulate in the slurry 58 of the basin 59, whereupon periodically the concentrated slurry is supplied to the filter station 26 (Fig. 1) for separation from the acid of the solids. The solids are recycled to be used as starting material, while the filtrate acid is recycled to the concentrated liquor basin 59. This treatment of the slurry 58 is not essential, but is desirable for efficient operation so that no acid or NaClO4 will be lost. The vertical disposition of the jacketed boiler zone is important for it is self-cleaning of its non-distillable residue, and in practice it is about 9 feet long. It is self-feeding and maintains its own working level because as liquor is vaporized from the liquid level 113, more liquor is automatically supplied thereto by the barometric leg 57 due to varying conditions therein, and thus the level is maintained substantially constant. However, the level varies within a limited range due to varying conditions, such as suction, barometric pressure, density of liquor, and so on, although the level is not perfectly constant it is nearly enough so as to maintain a practical working level.

The non-volatilizable material of the liquor from the Concentrator runs normally about 2%. Aside from the NaClO4, the most serious non-volatilizable contaminating constituent of the magma 58 of the basin 59, is iron. Iron is the most serious because the limit of contamination permitted by the trade is very low, about 1 part per million. There is a tendency of the iron to accumulate in the concentrated liquor 58 because it is very soluble and does not, like NaClO4, crystallize out. Salts of iron gradually cake or bake on the inside of the tubing in the boiler zone adjacent the liquid level 113, but this can be readily removed therefrom periodically during shut-down periods. This method of cleaning also removes some caking at the same point of NaClO4. But this tendency of the iron especially to remove itself from the liquor and accumulate in the boiler zone in a manner whereby it can be readily removed, is a highly important advantage flowing from this invention.

As to the working temperature of the boiler zone 56, it should meet the requirement of being high enough to evaporate all of the volatile components of the solution being treated therein, that is the HClO4, the water, and the volatile impurities such as HCl. Therefore, the temperature must be correlated with the pressure existing in the boiler zone. At a sub-atmospheric pressure of ¾" Hg measured at indicator 145, preferably used in practicing this process, there is preferably used about 147° C.

With respect to the Hot Condenser zone 60 of the Still 23, a study was made of curves representing the Vapor Pressure of several perchloric acid solutions ranging in concentration from 60% to 73% at temperatures ranging from 130° C. down to about 25° C. and of a second set, drawn from values obtained from the first set representing the concentration and temperature at which perchloric acid solutions will have certain Vapor Pressures ranging from 5 mm. to 45 mm. of mercury. From these curves, it was found possible to determine the relations between pressure, concentration of acid condensed, and the condensing temperature. For example, if vapor is being produced at 20 mm. of Hg (a trifle over ¾ inch) and condensation is taking place at 106° C. the concentration should be very close to 71.5%. If, for any reason, the pressure should increase to 25 mm. the acid condensed would be 70.0%. If the pressure should be decreased to 15 mm., no acid would be condensed because no ratio of $HClO_4$ and water will be liquid at 106° C. and 15 mm. This indicates the desirability of regulating the pressure. Acid containing 73.6% $HClO_4$ (or thereabouts) has the lowest vapor pressure, i. e., the highest boiling point of all $HClO_4$-$H_2O$ mixtures. Considering now the effect of temperature changes: At 20 mm. pressure and 100° C. the condensate would be 70.0%, at 106° C. about 71.5%, at 110° C.—73.0%, and at 115° C.—no condensation. This clearly indicates the desirability of temperature control.

So far, the existence of static equilibrium conditions has been assumed. But under actual working conditions, conditions are no longer static but dynamic. Vapor is not stationary but moving rapidly—the velocity is several feet per second. If not condensed within a few seconds in the comparatively short hot condensing zone, the vapor will pass beyond its influence into the intermediate condenser. The rate of distillation (consequently the vapor flow) is not perfectly constant, but varies appreciably due to a number of factors. The composition of the vapor is somewhat variable. There is a continuous flow of heat from the condensing acid through the glass wall of the Hot Condenser into the hot water. This requires a temperature difference between the vapor of the condensing acid and the hot water.

The entire Hot Condenser is not surrounded by hot water jackets since this construction would not be very practical. A considerable portion is exposed to air and is therefore air cooled. Even when insulated the effect of air-cooling is very appreciable, and the room temperature varies considerably. It is not practical to maintain pressure and temperature perfectly constant for obvious practical (mechanical) reasons.

This array of forces working against an operator makes the problem seem rather appalling. The fact that the system is dynamic, however, made possible the solution of the problem in a very practical way. Instead of controlling all of the critical factors with the precision which would be required in a static system, there is present another variable viz. the amount of $HClO_4$ vapor which is allowed to pass through the Hot Condenser uncondensed. In other words this condenser is overloaded.

This new factor overshadows, and to a very large extent eliminates the effects of the other variables. It is understandable that, if the vapor leaving the Condenser contains some perchloric acid which would have condensed if it could have found a surface upon which to dispose of its heat of vaporization, the prevailing conditions must necessarily be favorable to the condensation of strong acid. If this were not the case the acid would have condensed and heated the too cool surface, thus tending to create the favorable conditions. By this means there is maintained at all times a small, but adequate, reservoir of heat (the heat of vaporization of uncondensed perchloric acid) which tends to keep the inner face of the condenser "hot enough." Then, by the use of circulating hot water at a controlled temperature, heat is removed at the rate required to keep the condenser "cold enough." Thus there is maintained effectively, upper and lower limits. At some intermediate point which is determined by the effects of all the variables, the system adjusts itself and produces condensate which varies in composition between narrow limits, i. e. between 71 and 72% $HClO_4$. If it is wished to collect acid containing 72–73% $HClO_4$ it could be done, but at the sacrifice of a greater loss of uncondensed acid to the intermediate condenser.

The procedure in finding the proper Hot Condenser temperature is not as difficult as the explanation of the principles might lead one to believe. The vacuum is controlled at a desired value (¾" Hg in practice) and the temperature of the Hot Condenser is set at an arbitrary value. If the condensate is weak, the operator increases the temperature until the concentration of the condensed acid in basin 64 is somewhat over 71%, and has an average value between 71 and 72. If the uncondensed acid passing to the subsequent condensers is not excessive, the operator maintains the hot condensers at its present temperature. The operator makes minor adjustments from day to day, on this basis. It is important to remember, however, that temperatures are closely tied to all the factors of pressure, rate of distillation, amount of uncondensed $HClO_4$, condensing area, amount of air-cooling, etc.

At ¾" vacuum (19 to 20 mm.) measured at indicator 145, the Hot Condensers have been operated in the range 90° C. to 97° C. producing condensate containing 70.95 to 72.05% acid. These are maximum and minimum figures observed by the operators covering a reasonable period. These values may have been exceeded for short periods without having been observed but the averages are about 93° C. and 71.35% acid.

The length of the various barometric legs are substantially as indicated by the scale in feet at the left hand side of Fig. 3. They vary due to the difference in specific gravity of the liquid in each for maintaining the liquid therein about at the levels shown. Whereas "barometric leg" could be interpreted as being a valid description only in case the pressure above the liquid is due to the vapor pressure of the liquid in the "barometer" in the practice of this invention, the pressure is regulated by letting in a little air by means of the vacuum regulators 108 and 144. Thus the barometric legs of this invention are almost technically true barometric legs, but actually they are not quite so. However, the liquid seal for the leg against breaking the suction, is important. The vertical disposition of the boiler zones is advantageous, but naturally, this and other details of construction shown, can be modified without departing from the spirit of this invention, the scope of which can be discerned from the claims. Similarly, this invention is made up of many improvements, all of which need not be used, only in proportion as they are called for by the claims.

Whereas this invention has been described as treating reaction products of NaClO₄ and HCl, it is capable also of similarly treating reaction products of Ba(ClO₄)₂ and HCl.

I claim:

1. The process of making perchloric acid which comprises reacting hydrochloric acid with a perchlorate of a metal of the group consisting of sodium and barium under such conditions that a solid chloride and a solution of perchloric acid saturated with said chloride are obtained, separating the solid chloride and removing unreacted hydrochloric acid from the solution, distilling the solution under sub-atmospheric pressure while settling crystals which form in the distilling zone through a barometric column extending downwardly from the bottom of the distilling zone, and condensing and recovering perchloric acid vapors from the distillation.

2. The process of the class described of improving impure perchloric acid containing dissolved crystallizable solid impurities, which comprises passing such impure material to be treated into a vaporizing zone maintained at sub-atmospheric pressure and at a temperature correlated to said pressure whereby at least water is vaporized in said zone, maintaining in a pool at atmospheric pressure a quantity of concentrated acid supporting a barometric column of such acid extending into that zone, automatically maintaining substantially constant the elevation of the liquid level in that zone, continually settling suspended solid components residual in that zone through its liquid column to the pool for minimizing the solids-to-liquid ratio in that portion of the column within the vaporizer zone, sucking vaporized material from the vaporizing zone into a condensing zone maintained at sub-atmospheric pressure, collecting condensate from the condensing zone into a second pool while maintaining sub-atmospheric pressure in that zone, sucking vaporized material from the condensing zone, and recovering concentrated acid from at least one of said pools.

3. The continuous process of distilling impure perchloric acid containing dissolved crystallizable solid impurities, which comprises maintaining an enclosed barometric column of feed-acid supported from a pool thereof open to the atmosphere, supplying to that pool a solution of such acid to be distilled, heating the upper section of the column comprising a vaporizing zone to a temperature equal at least to that at which such acid vaporizes for distilling the solution in the vaporizing zone under subatmospheric pressure while forming crystals therein, sucking feed acid from the pool upwardly through its column into the vaporizing section thereof, automatically controlling the liquid level of the column to maintain it at substantially constant elevation, continually settling such crystals from the vaporizing section substantially as fast as they form therein downwardly through the liquid column to its pool simultaneously with the up-feed of acid in the same column, removing settled solids from the pool, sucking vaporized material from the vaporizing section into a condensing zone maintained at sub-atmospheric pressure, and collecting condensate from the condensing zone condensed from the vaporized material entering the condensing zone.

4. The process according to claim 3 wherein non-vaporized material spraying upwardly from the vaporizing zone is caught from further transit and returned through said vaporizing zone into the pool thereof.

5. The process according to claim 3, with the additional steps of filtering liquid suspension taken from the pool of the vaporizing zone to separate its solid and liquid constituents, and returning filtrate to the process.

6. The process of purifying impure perchloric acid containing dissolved crystallizable solid impurities, which comprises passing the material to be treated in solution into a vaporizing zone maintained under sub-atmospheric pressure wherein non-perchloric acid constituents crystallize as solids, maintaining terminating in that zone a column of liquid supported from a pool thereof open to the atmosphere and derived from such material, maintaining the solution in the vaporizing zone heated to a temperature equal to that at which such acid distills and crystals form therein while minimizing circulation in that zone, continually settling such crystals from the vaporizing zone through its liquid column to its pool substantially as fast as they present themselves in the vaporizing zone, removing settled crystals from that pool, sucking vaporized material from the vaporizing zone into a condensing zone at sub-atmospheric pressure and at a temperature above water's dew-point as it exists within said condensing zone while maintaining the condensing zone under sub-atmospheric pressure, collecting condensate therefrom in a column of such condensate supported from a pool thereof, sucking vaporized material from the condensing zone into a further condensing zone at sub-atmospheric pressure and cooled to a temperature below water's dew-point as it exists within said further zone, and removing liquid material from each of said pools whereby different concentrations of acid are obtained with the first-mentioned pool of condensate furnishing the strongest acid.

JOHN C. PERNERT.